(12) United States Patent
Elguezabal et al.

(10) Patent No.: US 7,029,738 B2
(45) Date of Patent: Apr. 18, 2006

(54) SYSTEM FOR DISCOURAGING THE REMOVAL OF IDENTIFICATION LABELS ADHERED TO A SURFACE

(75) Inventors: Alfredo Aguilar Elguezabal, Cumbres de Universidad (MX); Luis de la Torre Sáenz, Villas del Real (MX); Alejandro López Ortiz, Cumbres de Universidad (MX); Manuel Román Aguirre, Colonia las Granjas (MX); Oscar Ayala Valenzuela, Francisco I. Madero (MX)

(73) Assignees: Dinformatica del Noroeste S.A. de C.V., Chihuahua (MX); Centro de Investigacion en Materiales Avanzados S.C., Chihuahua (MX)

( * ) Notice: Subject to any disclaimer, the term of this patent is extended or adjusted under 35 U.S.C. 154(b) by 153 days.

(21) Appl. No.: 10/662,322

(22) Filed: Sep. 16, 2003

(65) Prior Publication Data

US 2004/0202813 A1 Oct. 14, 2004

(51) Int. Cl.
*B32B 9/00* (2006.01)

(52) U.S. Cl. .................... 428/40.2; 283/72; 283/81; 428/40.1; 428/40.9; 428/320.2; 428/321.5; 428/323; 428/913; 428/915; 428/916; 116/207; 116/216

(58) Field of Classification Search ............... 428/40.1, 428/40.2, 40.9, 323, 320.2, 321.5, 913, 915, 428/916; 283/72, 81; 116/207, 216
See application file for complete search history.

(56) References Cited

U.S. PATENT DOCUMENTS

| | | | |
|---|---|---|---|
| 4,516,679 A * | 5/1985 | Simpson et al. ......... 206/459.1 |
| 4,746,556 A | 5/1988 | Matsuguchi et al. |
| 4,876,123 A | 10/1989 | Rivera et al. |
| 5,082,702 A | 1/1992 | Alband |
| 5,629,093 A | 5/1997 | Bischof et al. |
| 5,916,944 A | 6/1999 | Camilletti et al. |
| 6,047,964 A * | 4/2000 | Lawandy et al. ......... 273/138.1 |
| 6,049,145 A | 4/2000 | Austin et al. |
| 6,284,337 B1 | 9/2001 | Lorimor et al. |

FOREIGN PATENT DOCUMENTS

FR 2 451 081 10/1980

* cited by examiner

*Primary Examiner*—Nasser Ahmad
(74) *Attorney, Agent, or Firm*—Young & Thompson

(57) ABSTRACT

A card label having a system for discouraging its non-authorized removal and reuse, which initiate an incontrollable combustion process that completely damage the card label and its information and included circuitry when it is attempted to remove the card label from a surface.

20 Claims, 5 Drawing Sheets ated to systems for discouraging non authorized changes or the removal of identification labels from a product, and more particularly to a label including a device for discouraging the unauthorized removal of the label from a product, which destroys the information contained in the label and/or destroy its microchip if included.

B. Description of Related Art

For identification applications, it's very common the use of identification cards which adhere to the surface of a product to be identified or described. In some applications the card may be removed form the product in order to be adhered to other product for illegal purposes.

The development of new technologies for the protection of documents has been traditionally oriented towards the label and identification cards made by multilayer lamination.

The French patent No. FR-A-2451081 discloses a system in which one of the layers comprising an identification label, contains a plurality of micro-capsules filled with ink, in this way, when it is attempted to separate one layer from another, some of the micro-capsules broke thus permanently staining the label with ink and indicating that an attempt for breaking or removing the label has been perpetrated. However this system is not suitable for using with identification means which are not visually inspected such as magnetic, electro-magnetic or radio-frequency devices.

Another type of protection systems, include zones with different adhesion coefficients over one of the layers comprising a multilayer label, which cause that during the separation of the layers, the layer containing information printed in one of the layers contacting the zones with higher adherence coefficient be ripped and damaged, such as the systems described in the patents Nos. U.S. Pat. Nos. 4,876,123, 5,082,702, 5,629,093, and DEA 36 08 907. However this multilayer system is neither suitable for using with identification means which are not visually inspected, such as those that are read or identified by electronic means.

An improvement over the above referred systems would be the incorporation of a heat deformable layer (as disclosed in U.S. Pat. No. 6,284,337) which avoids the separation of the layers by softening the adhesive with heat.

Regarding to the protection of labels including an electronic circuit, some systems suggest the application of a high resistance adhesive in certain sections of a layer in contact with certain sections of the chip in such way that when someone try to remove the label, the layer having the high resistance adhesive pull up and rip some zones of the chip make it useless, such as the system disclosed in U.S. Pat. No. 6,049,145. However, there is the possibility of fixing the circuit by welding or reconnecting the damaged zones of the circuit, In order to avoid the unauthorized copy of electronic circuits, there has been proposed the use of covers over the circuits such as the cover disclosed in U.S. Pat. No. 5,916,944, so that when there is an attempt for analyzing the circuit structure, a polymerization action is activated which covers the circuit and avoids the circuit analysis, although the circuit remains fully functional, which is a disadvantage.

Therefore it would be desirable to have a security device for identification labels that completely destroys the i information and circuitry contained in said label in case an unauthorized attempt to remove the label is perpetrated thus making the label completely useless and beyond repair.

In view of the above referred necessities and disadvantages of the systems of the prior art, applicant developed a system for discouraging that labels permanently adhered to a surface be removed and reused. Applicant's system contains an activator substance that reacts with an oxidant and starts a combustion which permanently damages the label when it is attempted to remove the label from a surface. If the destruction of a specific element that can not be affected by the combustion is needed, the system includes an element that raises the temperature in specific sections of the label.

The system of the present invention comprises in its most general embodiment:

When it is attempted to remove the base card from the surface, the mechanical forces will tear any of the spheres or activator container and starts an uncontrollable combustion reaction that permanently damages the first, second and third layers.

SUMMARY OF THE INVENTION

It is therefore a main object of the present invention to provide a system for discouraging that labels permanently adhered to a surface be removed and reused.

It is therefore another object of the present invention, to provide a system of the above referred nature which contains an activator substance that reacts with an oxidant and starts a combustion which permanently damages the label when it is attempted to remove the label from a surface.

It is another main object of the present invention to provide a system of the above referred nature which includes an element that raises the temperature in specific sections of the label.

It is yet another main object of the present invention to provide a system of the above referred nature in which an uncontrollable combustion reaction that permanently damages the label, is started when it is attempted to remove the label from a surface.

These and other objects and advantages of the system for discouraging the removal of identification labels adhered to a surface of the present invention will become apparent to those persons having an ordinary skill in the art, from the following detailed description of the embodiments of the invention, which will be made with reference to the accompanying drawings.

DETAILED DESCRIPTION OF THE INVENTION

Figure 1:
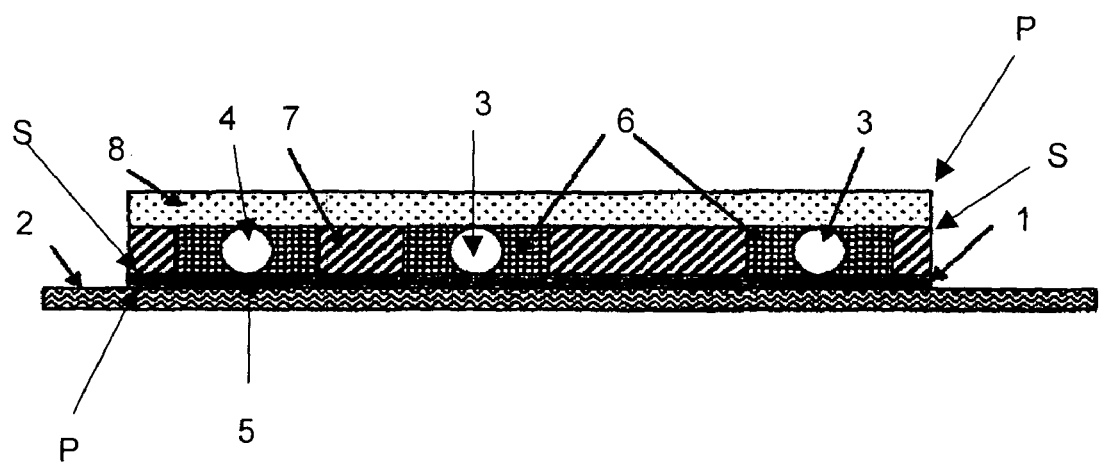
FIG. 1 is a cross section view of a card having the system for discouraging the removal of identification labels adhered to a surface of the present invention in a first embodiment.

The system for discouraging the removal of identification labels adhered to a surface of the present invention, will now be described in accordance with a preferred embodiment thereof, illustrated in the accompanying drawings wherein the same signs and numbers, refer to the same parts of the shown figures, comprising:

a base card including:

a first layer 1, made of a flexible plastic material comprising polyvinyl chloride, having a first "P" and a second "S" surfaces (not shown) both impregnated with an adherent substance comprising polyurethane, wherein the first surface "P" adheres to the product or desired surface 2 and wherein the second surface "S" has a plurality of specific zones having a higher adherence (not shown) evenly distributed thereof, wherein the force necessary for separating each of the zones having a higher adherence from a contacting surface is approximately the double of the force necessary for separating the rest of the surface of the first layer from the same contacting surface;

a second layer comprising:

a plurality of bubble or cylindrical shaped blisters 3 made of a plastic material comprising polyethylene or glass, each of one filled with a chemical activator substance comprising sulfuric acid and each one having a first and a second opposed covers easily breakable 4, 5, and adhered to first layer 1 over the zones having a higher adherence, so that the plurality of blisters 3 remain evenly distributed over the first layer 1 and adhered thereof by the higher adherence adhesive;

a plurality of inserts 6 using paper as base material and impregnated with: a co-activator material based on metallic oxyhalides, a detonator based on sulfur, a combustible material contributing with an easily oxidizable material and a stabilizer agent based on metallic oxide, each adhered to the first layer 1 and surrounding each of the blisters which are fixed to each insert;

a plurality of paper filling plaques 7, each adhered to the first layer and surrounding each insert 6 and filling the remaining spaces between them in order to maintain uniform the thickness of the second layer;

a third paper layer 8, having a first "P" and a second "S" surface, wherein the second surface is impregnated with an adhesive substance for adhering the third layer to each of the elements of the second layer, and serves as a cover.

The first layer 1 may be made of polypropylene or polyethylene or any other rigid plastic and the adhesive substance may comprise additionally cyanoacrilate, epoxy resin or base polyester.

Although it was disclosed that the second layer has a plurality of blisters 3 having a bubble shape, it may be used blisters having a cylindrical shape.

Furthermore, although it was described that the filling plaques 7 and the third layer 3 are made of paper, they may be made of cardboard or plastic too. Besides, the filling plaques 7 may not be included if there is not required to maintain the thickness of the second layer.

The information may be printed or adhered both in the first surface "P" of the first layer 1 as in the first surface "P" of the third layer 8.

Also, although it was disclosed that the blisters 3 of the second layer are made of a plastic material, they may be made of glass or any other inert material that can withstand the chemical attack of any acid, particularly sulfuric acid. The walls have to be easily breakable or damageable once they have been adhered by its opposed covers 4, 5.

The base material of the inserts 6 may comprise additionally: cotton, adhesive, textiles wood or particles and/or wood powder, plastic, or any incombustible chemical compound, plus potassium chlorate or bromate, any source of organic or inorganic combustible material, preferably sugar, sulfur, and a stabilizer agent of all the mix, which may comprise an oxide, hydroxide or metallic carbon. The inserts may also not include any base material, and may just be comprised by a tablet or a sheet 9 made of a compressed powder of the above referred materials, and each insert having a perforation 10 in its central portion for receiving a blister.

The proportion of components in each insert may be: from between 30 to 70% in weight of chlorate or bromate as a co-activator material, from between 1 to 15% in weight of sulfur as a detonator, from between 0.5 to 10% in weight of oxide, hydroxide or carbonate as stabilizer agent and from 20% to 60% in weight of combustible material.

When it is attempted to remove the base card from the surface 2, any of the blisters is tore or broken by the mechanical force and initiates an uncontrollable exothermic reaction between the acid and the inserts compounds that generates a combustion process that permanently damages the first 1 and the third layer 8. As the blisters 3 are fixed to the inserts too 6, even if someone try to separate the base card by means of a palette knife, it would irremediably broke one of the blisters.

For identification applications using a circuit plaque, in a second embodiment of the present invention, the identification circuitry 11 and its connections 12 are incorporated into the second layer and surrounded by the inserts 6. Additionally a metallic compound 13 such as aluminum powder or a magnesium tape is placed over the circuitry 11 which causes an excessive heat generation over the circuitry when the combustion is generated thus completely destroying it and making it completely useless and beyond repair. This metallic insert 13 is preferably made of sodium, magnesium, aluminum, potassium or iron, having a width of 0.1 mm or more, and which is susceptible of oxidizing thus generating a great amount of heat.

EXAMPLES

Example 1

Figure 2:
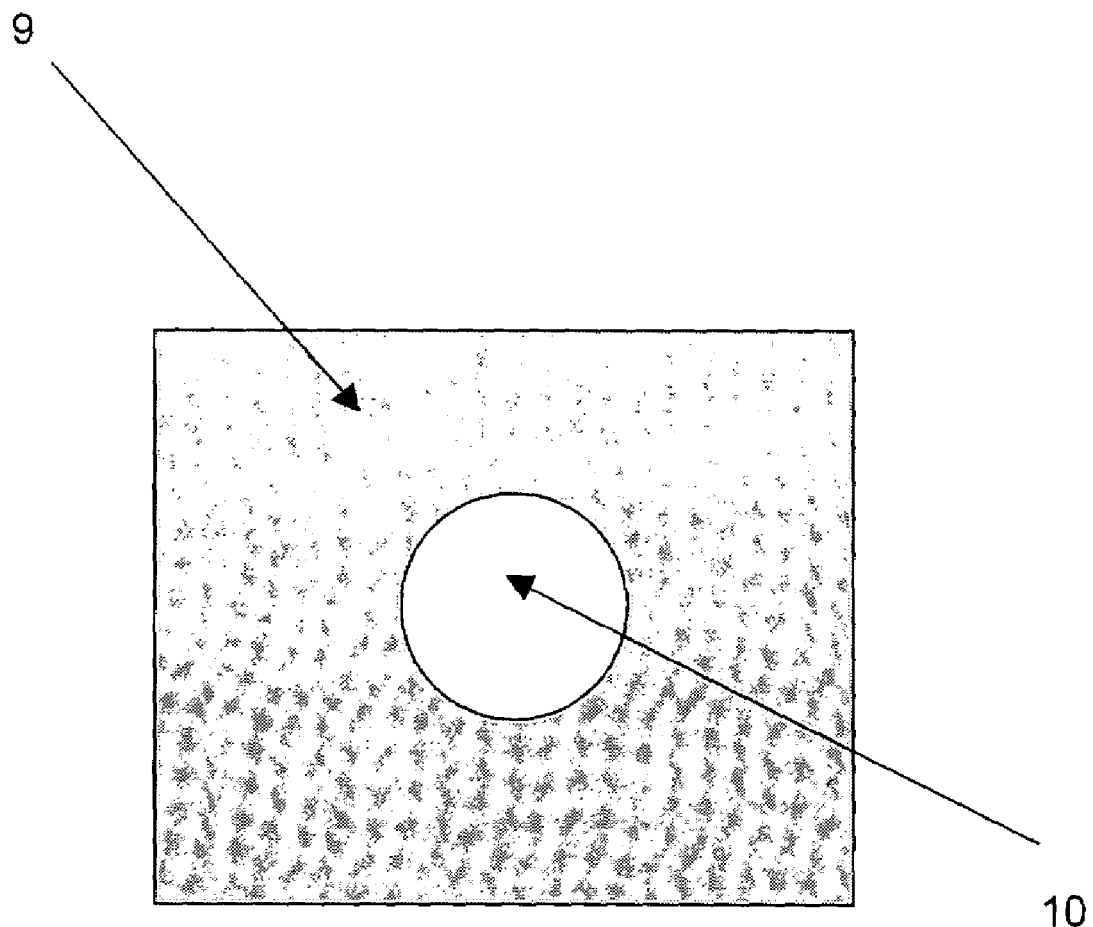
FIG. 2 is an upper view of a cylindrical shaped insert made of compressed powders, used in the system for discouraging the removal of identification labels adhered to a surface of the present invention.
Figure 3:
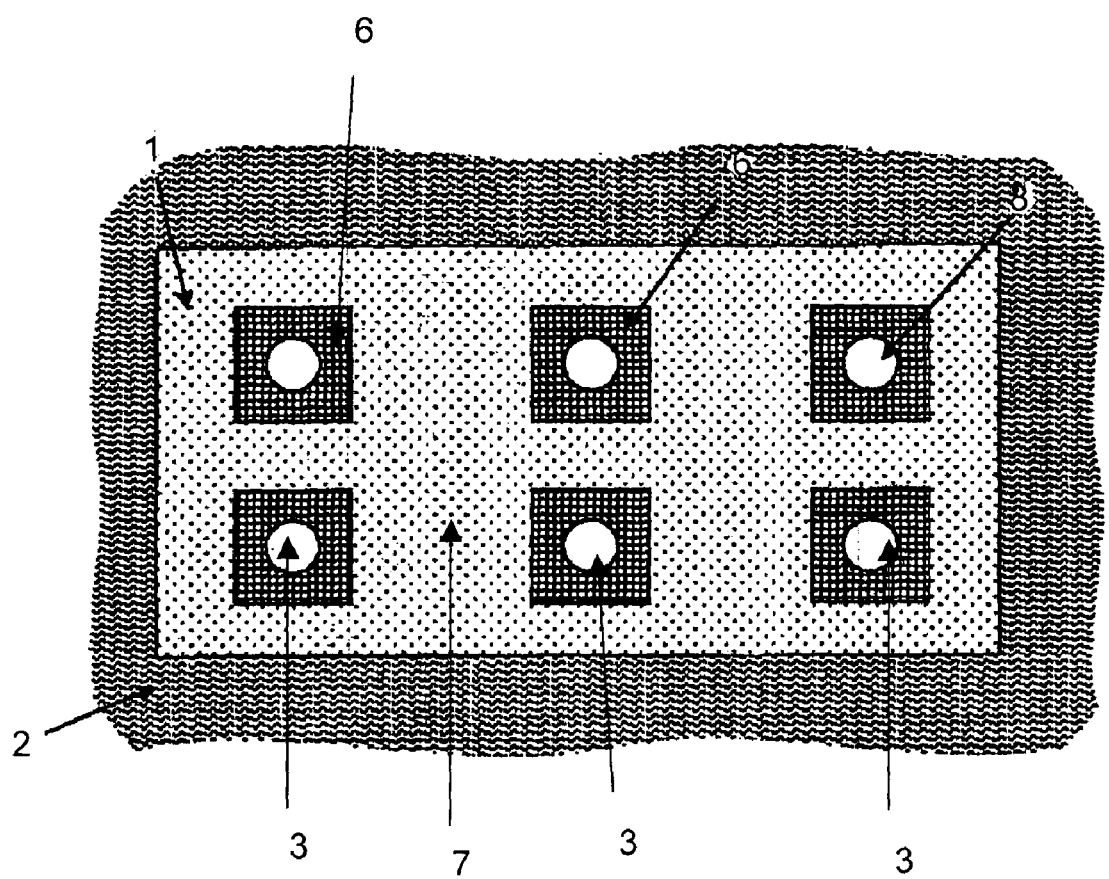
FIG. 3 is an upper view of a card having the system for discouraging the removal of identification labels adhered to a surface of the present invention in a first embodiment thereof, having the third layer removed for showing all of the elements of the second layer.

There were prepared inserts made of a co-activator combustible material, by mixing an aqueous solution/suspension comprised by potassium chlorate, sulfur, magnesium oxide and sugar in a proportion of 15:1:1:10. The aqueous solution was placed over a Petri disc having a filter paper fixed at its bottom. Next, it was evaporated all the water of the a queous solution by heating the aqueous solution placed over the Petri this by which it was obtained a paper impregnated with the disclosed compounds. The inserts were cut as shown in FIG. 1. The blisters were prepared by injecting sulfuric acid in polyethylene spheres and sealing the injection orifice with silicon. It was used an adhesive tape as a back cover (third layer), wherein only one face of the tape included an adhesive compound. The blisters and inserts were placed over one face of a double faced tape having adhesive in both faces as shown in FIGS. 1 and 2. The back cover was placed without using any filling plaques and contacting its adherent face with the blisters and inserts and over the doubled faced tape thus forming a card. There were created cut guides over the double faced tape and it was applied a super strong glue in the opposed face and in the delimited zones for adhering it over a surface. When it was intended to carefully separate the card from the surface, a blister proximate to the zone where it was intended to separate the card, broke and initiated an uncontrollable combustion that damaged the label. When a second attempt for separating the label from the surface was intended, at least one blister broke, initiating combustion and further damaging the card.

Example 2

This example was carried out using the same components and assembly method of example 1, but the inserts were prepared by drying the suspension for obtaining a powder and subsequently compressing said powder in order to obtain a tablet as shown in FIG. 2. The tablets were formed by means of a press and a dice. Additionally there was formed a perforation in the central portion of each tablet by means of a punch for receiving a blister. The rest of the test was performed in the same way as in example 1 and obtaining exactly the same results.

Example 3

In this example there was incorporated a silica nitride microprocessor into the card. The card was assembled using the same components and elements as those used in example 1, but without placing the metallic compound over the microprocessor. When it was attempted to detach the card, it was initiated an exothermic reaction that produced a combustion which damaged the card and produced a completely visual deterioration, however, when measuring the electric properties of the microprocessor, these were found intact, and the microprocessor could be reused.

Example 4

Figure 4:
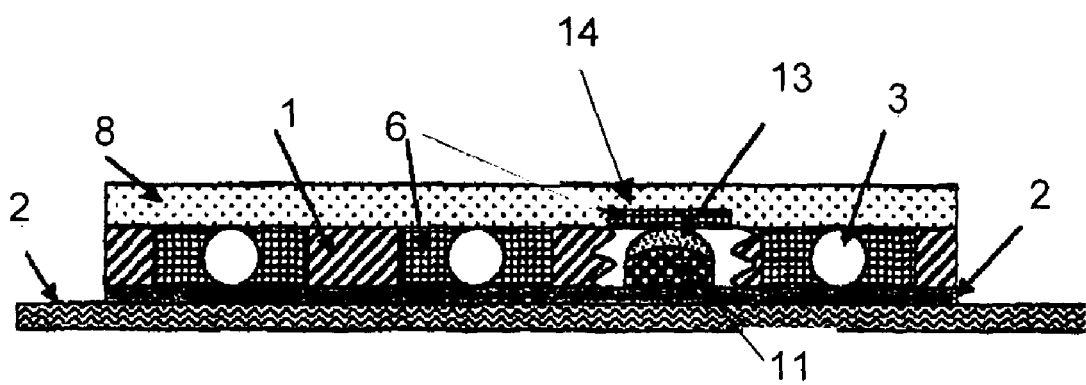
FIG. 4 is a cross section view of a card having the system for discouraging the removal of identification labels adhered to a surface of the present invention in a second embodiment thereof.
Figure 5:
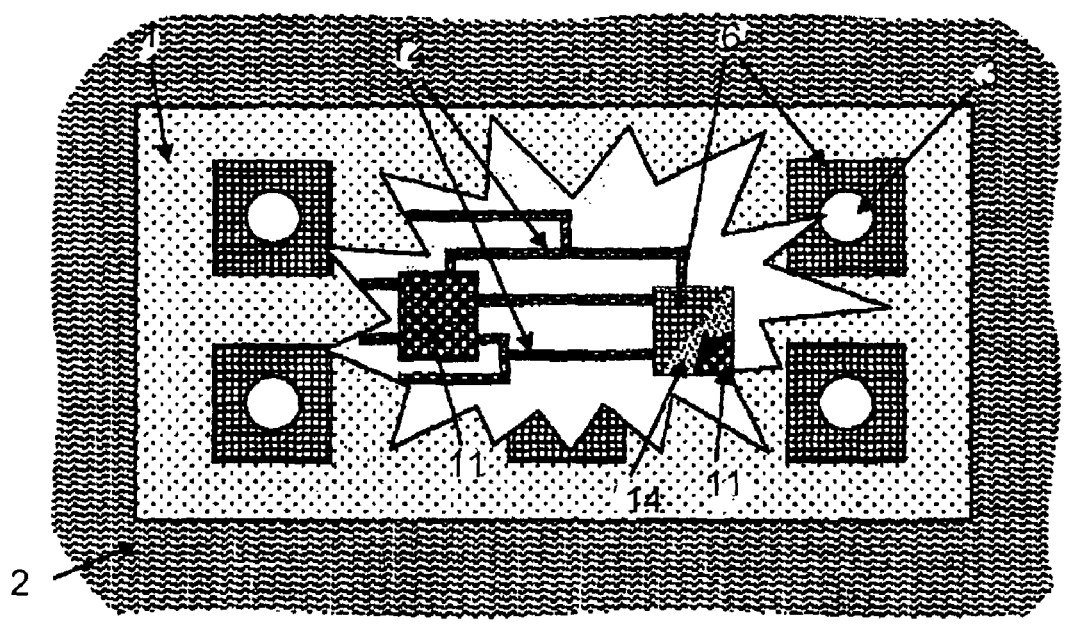
FIG. 5 is an upper view of a card having the system for discouraging the removal of identification labels adhered to a surface of the present invention in a second embodiment thereof, having the third layer removed for showing all of the elements of the second layer.

In this example it was prepared a mix containing 0.5 ml of glycerin and 4 g of aluminum powder having an average particle size of 1 micron. A card having a microprocessor was assembled as shown in FIG. 4. Approximately one third of the glycerin/aluminum mix was put over the microprocessor. When it was attempted to detach the card, it was initiated an exothermic reaction which produced a more violent combustion than in previous examples, which was verified by the expansion of the fire, which was greater than in previous experiments. It was observed that the aluminum powder reached a temperature until it was red hot. As in previous examples the card was severely damaged producing a serious visual deterioration. When it was attempted to recover the microprocessor it disintegrated in a silica nitride powder leaving its metallic components exposed. The microprocessor could not be reused.

Example 5

A card was assembled using the same components and elements as those used in example 4, but using a low pressure compressed aluminum powder disc instead of the glycerin/aluminum mix. The disc was placed over the microprocessor. The obtained results were similar to the results obtained in example 4.

Example 6

A card was assembled using the same components and elements as those used in example 4, but using a section of metallic magnesium tape instead of the glycerin/aluminum mix. The tape was placed over the microprocessor. The obtained results were similar to the results obtained in example 4 but a more violent combustion was observed which was verified by the expansion of the fire, which was greater than in example 4 and by observing that the metal was heated until white hot and the aluminum until red hot.

Example 7

A card was assembled using the same components and elements as those used in example 4, but using a mix of metallic magnesium and glycerin instead of the glycerin/aluminum mix. The mix was placed over the microprocessor. The obtained results were similar to the results obtained in example 4.

Example 8

A card was assembled using the same components and elements as those used in example 4, but using glass cylinders instead of bubbles for containing the sulfuric acid. As a back cover it was used rigid polystyrene having channels for fixing the glass cylinders to the cover. The cover was previously marked in sections in order to allow the cover to be detached in sections. When it was attempted to detach the card, the obtained results were similar to the results obtained in the previous examples since the cover folded over one of the marks breaking one glass cylinder and initiating an exothermic reaction than produced combustion.

What is claimed is:

1. A system for discouraging the removal of identification labels adhered to a surface comprising:
    a base card with
        a first layer having a first and a second surface which are impregnated with an adhesive substance, wherein the first surface adheres to a product or desired surface;
        a second layer having a plurality of breakable blisters filled with a chemical activator substance, each adhered to the second surface of the first layer and evenly distributed over the second surface of the first layer, and a plurality of inserts having from between 30 to 70% in weight of a co-activator material, from between 1 to 15% in weight of a detonating material, from between 10 to 60% in weight of combustible material and from between 0.5% to 10% in weight of a stabilizer material, each insert adhered to the second surface of the first layer and surrounding a blister; and
        a third layer having a first and a second surface impregnated with an adhesive substance for adhering to each of the elements of the second layer,
    wherein, when it is attempted to separate the base card from the surface, a mechanical force is applied over the card that breaks one or more blisters and spills the activator chemical substance which reacts with the components of the surrounding insert and initiates an exothermic reaction that produce a combustion which permanently and severely damages the first, second and third layers.

2. A system for discouraging the removal of identification labels as claimed in claim 1, wherein each blister has a sphere shape.

3. A system for discouraging the removal of identification labels as claimed in claim 1, wherein each blister has a cylinder shape.

4. A system for discouraging the removal of identification labels as claimed in claim 1, wherein each blister is filled with a strong acid.

5. A system for discouraging the removal of identification labels as claimed in claim 1, wherein each blister is filled with sulfuric acid.

6. A system for discouraging the removal of identification labels as claimed in claim 1, wherein each blister is made of a plastic material.

7. A system for discouraging the removal of identification labels as claimed in claim 1, wherein each blister is made of polyethylene.

8. A system for discouraging the removal of identification labels as claimed in claim 1, wherein each blister is made of glass.

9. A system for discouraging the removal of identification labels as claimed in claim 1, wherein each blister has a first and a second opposed surface easily breakable and each adhered to the second surface of the first and third layer respectively.

10. A system for discouraging the removal of identification labels as claimed in claim 1:
   wherein the second surface of the first layer has a plurality of extra-adherence specific zones, evenly distributed over said second surface, wherein the force necessary for separating each of the zones having extra-adherence from a contacting surface is approximately double the force necessary for separating the rest of the second surface having the adherent substance of the first layer from the same contacting surface;
   wherein each blister has a first and a second opposed surface easily breakable and adhered to an extra adherence zone of the second surface of the first layer and to the second surface of the third layer respectively.

11. A system for discouraging the removal of identification labels as claimed in claim 1, wherein the co-activator material comprise metallic oxyhalides.

12. A system for discouraging the removal of identification labels as claimed in claim 1, wherein the detonating material comprise sulfur.

13. A system for discouraging the removal of identification labels as claimed in claim 1, wherein the stabilizer material is selected from the group comprising: oxides, hydroxides, and metallic carbonates.

14. A system for discouraging the removal of identification labels as claimed in claim 1, wherein the inserts further including a support material selected from the group comprising: paper, cotton, textile material, wood, adhesives or wooden powder or particles, said support material being impregnated with the co-activator material, detonating material, combustible material and stabilizer material.

15. A system for discouraging the removal of identification labels as claimed in claim 1, wherein the inserts comprising a compressed tablet having a central perforation for receiving a blister, and having the following compressed material: from between 20 to 60% in weight of an organic or inorganic combustible substance powder, and from between 0.5 to 10% in weight of a stabilizer material powder selected from the group comprising: oxides, hydroxides or metallic carbonates.

16. A system for discouraging the removal of identification labels as claimed in claim 1, wherein the inserts comprising a compressed tablet the following compressed material: from between 30 to 70% in weight of chlorate or bromate, from between 1 to 15% in weight of sulfur, from between 0.5 to 10% in weight of oxide, hydroxide or carbonate and from 20% to 60% in weight of a combustible material.

17. A system for discouraging the removal of identification labels as claimed in claim 1, wherein the second layer additionally including a plurality of filling plaques made of a material selected from the group comprising: paper, cardboard or plastic, each adhered to the second surface of the first layer filing the spaces between each insert for maintaining uniform the thickness of the second layer.

18. A system for discouraging the removal of identification labels as claimed in claim 1, including a circuit plaque incorporated into the second layer and surrounded by the inserts.

19. A system for discouraging the removal of identification labels as claimed in claim 1, including a circuit plaque incorporated into the second layer and surrounded by the inserts and further including:
   a metallic compound placed over the circuit plaque, in order to generate heat when a combustion is produced, thus destroying the circuit board, said metallic compound selected from the group consisting of aluminum powder and a magnesium tape.

20. A system for discouraging the removal of identification labels as claimed in claim 1, including a circuit plaque incorporated into the second layer surrounded by the inserts and further including: a metallic insert made of oxidizable material selected from the group consisting of sodium, magnesium, aluminum, potassium and iron, having a width of at least 0.1 mm, said metallic insert placed over the circuit plaque and generating heat when it is oxidized.

* * * * *